(12) United States Patent
Franger et al.

(10) Patent No.: US 7,529,014 B2
(45) Date of Patent: May 5, 2009

(54) BORON-SUBSTITUTED LITHIUM COMPOUNDS, ACTIVE ELECTRODE MATERIALS, BATTERIES AND ELECTROCHROME DEVICES

(75) Inventors: Sylvain Franger, Gif-sur-Yvette (FR); Frédéric Le Cras, Combe Bougey (FR); Carole Bourbon, Les Fourcoules (FR)

(73) Assignee: Commissariat a l'Energie Atomique, Paris (FR)

( * ) Notice: Subject to any disclaimer, the term of this patent is extended or adjusted under 35 U.S.C. 154(b) by 189 days.

(21) Appl. No.: 10/536,178

(22) PCT Filed: Dec. 2, 2003

(86) PCT No.: PCT/FR03/50148

§ 371 (c)(1),
(2), (4) Date: Oct. 27, 2005

(87) PCT Pub. No.: WO2004/052787

PCT Pub. Date: Jun. 24, 2004

(65) Prior Publication Data

US 2006/0127295 A1 Jun. 15, 2006

(30) Foreign Application Priority Data

Dec. 5, 2002 (FR) .................. 02 15343

(51) Int. Cl.
*C01B 35/10* (2006.01)
*G02F 1/15* (2006.01)
*H01M 4/88* (2006.01)
*H01M 4/48* (2006.01)
*H01M 4/50* (2006.01)
*H01M 4/52* (2006.01)
*H01M 4/58* (2006.01)

(52) U.S. Cl. .................. 359/265; 252/182.1; 423/277; 429/220; 429/221; 429/223; 429/224; 429/229; 429/231.1; 429/231.2; 429/231.3; 429/231.5; 429/231.95

(58) Field of Classification Search ............... 423/306, 423/277; 359/265; 252/182.1; 429/220, 429/221, 223, 224, 229, 231.5, 231.95, 231.1, 429/231.2, 231.3
See application file for complete search history.

(56) References Cited

U.S. PATENT DOCUMENTS 6,085,015 A  7/2000  Armand et al.
6,461,770 B1  10/2002  Nishiguchi et al.

FOREIGN PATENT DOCUMENTS

| EP | 1 195 826 | 4/2002 |
| EP | 1 195 827 | 4/2002 |
| EP | 1 195 835 | 4/2002 |
| EP | 1 195 836 | 4/2002 |
| EP | 1 195 837 | 4/2002 |
| EP | 1 195 838 | 4/2002 |
| JP | 2002117843 | 4/2002 |
| JP | 2002117903 | 4/2002 |
| WO | WO 03/056646 | 7/2003 |

OTHER PUBLICATIONS

Yamada et al. "Optimized LifePO$_4$ for Lithium Battery Cathodes" *J. Electrochemical Society* 148(3):A224-A229 (2001), no month.
Masquelier et al. "A Powder Neutron Diffraction Investigation of the Two Rhombohedral NASICON Analogues: γ-Na$_3$Fe$_2$(PO$_4$)$_3$ and Li$_3$Fe$_2$(PO$_4$)$_3$" *Chem. Mater.* 12:525-532 (2000), no month.

*Primary Examiner*—Wayne Langel
(74) *Attorney, Agent, or Firm*—McKenna Long & Aldridge LLP

(57) ABSTRACT

Lithium insertion compound having the following formula (I):

$$Li_\alpha M_\beta M1_v M2_w M3_x M4_y M5_z B_\gamma (XO_{4-\epsilon} Z_\epsilon)_1 \quad (I)$$

M is selected from $V^{2+}$, $Mn^{2+}$, $Fe^{2+}$, $Co^{2+}$ and $Ni^{2+}$;
M1 is selected from $Na^+$ and $K^+$;

M2 is selected from $Mg^{2+}$, $Zn^{2+}$, $Cu^{2+}$, $Ti^{2+}$, and $Ca^{2+}$;

M3 is selected from $Al^{3+}$, $Ti^{3+}$, $Cr^{3+}$, $Fe^{3+}$, $Mn^{3+}$, $Ga^{3+}$, and $V^{3+}$;

M4 is selected from $Ti^{4+}$, $Ge^{4+}$, $Sn^{4+}$, $V^{4+}$, and $Zr^{4+}$;

M5 is selected from $V^{5+}$, $Nb^{5+}$, and $Ta^{5+}$;

X is an element in oxidation state m, exclusively occupying a tetrahedral site and coordinated by oxygen or a halogen, which is selected from $B^{3+}$, $Al^{3+}$, $V^{5+}$, $Si^{4+}$, $P^{5+}$, $S^{6+}$, $Ge^{4+}$ and mixtures thereof;

Z is a halogen selected from F, Cl, Br and I;

the coefficients $\alpha$, $\beta$, v, w, x, y, z, $\gamma$ and $\epsilon$ are all positive and satisfy the following equations:

$0 \leq \alpha \leq 2$ (1);

$1 \leq \beta \leq 2$ (2);

$0 < \gamma$ (3);

$0 \leq \alpha \leq 2$ (3);

$0 \leq \epsilon \leq 2$ (4);

$\alpha + 2\beta + 3\gamma + v + 2w + 3x + 4y + 5z + m = 8 - \epsilon$ (5); and $$0 < \frac{\gamma}{\beta + v + w + x + y + z} \leq 0.1,$$

preferably, $$0 < \frac{\gamma}{\beta + v + w + x + y + z} \leq 0.05.$$

Methods for preparing these compounds.

Active materials of electrodes, in particular of positive electrodes containing said compounds, and batteries and electrochromic devices using these compounds.

20 Claims, 2 Drawing Sheets

BORON-SUBSTITUTED LITHIUM COMPOUNDS, ACTIVE ELECTRODE MATERIALS, BATTERIES AND ELECTROCHROME DEVICES

This application is a national phase application of PCT Application No. PCT/FR2003/050148 filed on Dec. 2, 2003, which claims the benefit of French Patent Application No. 02 15343 filed on Dec. 5, 2002, which are both hereby incorporated by reference.

The present invention relates to lithium insertion compounds, more precisely it deals with lithium insertion compounds containing boron, substituted by boron, doped with boron, with a polyanionic skeleton.

The invention further relates to active materials of electrodes, in particular of positive electrodes containing said compounds, as well as batteries and electrochromic devices using these compounds.

Lithium batteries are increasingly used as self-contained energy sources, in particular in portable equipment, such as computers, telephones, organizers, camcorders, etc., where they are gradually replacing nickel-cadmium (NiCd) and nickel-metal hydride (NiHM) batteries. This development has occurred because the performance of lithium batteries in terms of energy intensity (Wh/kg, Wh/l) is substantially superior to that of the two systems mentioned above.

The active electrode compounds used in these batteries are chiefly $LiCoO_2$, $LiNiO_2$ and $LiMn_2O_4$ for the positive electrode, and carbon, such as graphite or coke, etc., for the negative electrode. The theoretical and pratical capacities of these compounds are respectively 275 mAh/g and 140 mAh/g for $LiCoO_2$ and $LiNiO_2$, and 148 mAh/g and 120 mAh/g for $LiMn_2O_4$, for an operating voltage of about 4 volts with respect to metal lithium.

It has been proved that manganese oxides, and particularly the spinel structure family $Li_{1+x}Mn_{2-x}O_4$ ($0 \leq x \leq 0.33$), are capable of demonstrating comparable electrochemical performance to that of cobalt and nickel oxides. It also appears that the greater natural abundance of manganese, and the lower toxicity of these oxides compared with cobalt and nickel, are an important advantage for their widespread use in batteries.

In the particular case of $LiMn_2O_4$, it has nevertheless been demonstrated that its combined use with the electrolytes formulated for operation in the neighbourhood of 4 volts with respect to lithium metal, and which contain lithium hexafluorophosphate, results in progressive dissolution of the manganese oxide and consequently a shorter battery lifetime.

Furthermore, two families of compounds used for is electrochemical reactions have the advantage of being potentially inexpensive and non-toxic: these are the olivine isotype family and the Nasicon family; it should be observed that the name Nasicon means "sodium (Na) SuperIonic Conductor" and that this compound has, in particular, the formula $Na_xM_2X_3O_{12}$, where M is a transition metal and X is P, Mo, Si, Ge, S, with $0<x<5$ and, preferably, $x=3$.

These two families consist of equivalent elements and only differ in the ratio of the number of polyanions to the number of lithium ions and in their crystal structure. In fact, the olivine isotype family has an orthorhombic crystal lattice and the Nasicon isotype family has a rhombohedral lattice.

Materials of an olivine isotype structure with an orthorhombic crystal lattice, such as $Li_{1-x}FePO_4$, for example $LiFePO_4$ (triphylite) have the advantage of being potentially inexpensive and non-toxic. In the case of $LiFePO_4$, the insertion/extraction of lithium occurs in a two-phase process at $3.45V/Li^+/Li$, making this compound stable in almost all organic solvents. Moreover, it proves to be much more stable in the charged state ("$FePO_4$") in the presence of electrolyte than the aforementioned oxides, making its use in batteries extremely safe.

However, the major problem of this family of compounds is their low electronic and ionic conductivity at ambient temperature. This accordingly limits the kinetics of lithium, insertion/extraction in the host structure and the use of these compounds at relatively low charge/discharge rates.

Furthermore, the compounds of the Nasicon structure, that is with the formula $AxM_2 (XO_4)_3$, where A is an alkali metal, such as Na, also offer an advantage as an active positive electrode material, thanks in particular to their high ionic conductivity of the lithium ions. However, like the compounds of an olivine structure, they are poor electronic conductors, which limits their use.

Moreover, due to the poor electrochemical kinetics, the compounds of the two structural families described above cannot be used as active materials in an electrochromic device.

Document U.S. Pat. No. 6,085,015 describes lithium insertion materials of the orthosilicate type containing a tetranion $SiO_4^{4-}$. This is actually a sub-family of olivine, with a silicate group in which the core metal, that is the metal that participates electronically in the electrochemical reaction, is doped with various other metals.

The materials of this document have the following general formula:

in which:

M is $Mn^{2+}$ or $Fe^{2+}$ and mixtures thereof;

D is a metal in oxidation state +2 selected from $Mg^{2+}$, $Ni^{2+}$, $Co^{2+}$, $Zn^{2+}$, $Cu^{2+}$, $Ti^{2+}$, $V^{2+}$, $Ca^{2+}$;

T is a metal in oxidation state +3 selected from $Al^{3+}$, $Ti^{3+}$, $Cr^{3+}$, $Fe^{3+}$, $Mn^{3+}$, $Ga^{3+}$, $Zn^{2+}$ and $V^{3+}$;

Q is a metal in oxidation state +4, selected from $Ti^{4+}$, $Ge^{4+}$, $Sn^{4+}$, and $V^{4+}$;

R is a metal in oxidation state +5, selected among $V^{5+}$, $Nb^{5+}$, and $Ta^{5+}$.

All the M, D, T, Q and R are elements occupying octahedral or tetrahedral sites, s, p, g, v, a and b are stoichiometric coefficients for $S^{6+}$ (sulphate), $P^{5+}$ (phosphate), $Ge^{4+}$ (germanate), $V^{5+}$ (vanadate), $Al^{3+}$ (aluminate) and $B^{3+}$ (borate) respectively occupying tetrahedral sites.

The stoichiometric coefficients d, t, q, r, p, s, v, a and b are positive and between 0 and 1.

The materials of this document do not provide a significant improvement over the materials with the two formulas mentioned above, that is of the olivine or Nasicon type. In fact, their electronic and ionic conductivities at ambient temperature are low and their electrochemical kinetics is limited.

Document EP-A2-1 195 827 relates to a method for preparing an active cathode material with the general formula:

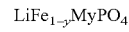

where M is selected from the group consisting of Mn, Cr, Co, Cu, Ni, V, Mo, Ti, Zn, Al, Ga, Mg, B and Nb with $0.05 \leq X \leq 1.2$ and $0 \leq y \leq 0.8$, in which the starting materials necessary for the preparation of the material are mixed, the mixture is ground, the mixture obtained after grinding is compressed to a preset density, and the compressed mixture is sintered. A carbon bearing material is stirred at any one of the steps of the preparation method. In the examples, as the compound comprising boron, only the compound with the formula $LiFe_{0.25}B_{0.75}PO_4$ is prepared.

The theoretical calculation shows that these compounds present very low theoretical specific capacities, of about 50 mAh/g.

A still unsatisfied need therefore exists for a lithium insertion compound that has a high electronic conductivity and high ionic conductivity and hence excellent electrochemical kinetics, better in any case than those of the compounds of the prior art, particularly better than those of the compounds of the olivine or Nasicon type, or the compounds of document U.S. Pat. No. 6,085,015.

A need consequently exists for a lithium insertion compound which can be used at high charge/discharge rates.

A need also exists for a lithium insertion compound which has a high theoretical specific capacity greater than that of the compounds of the prior art.

These excellent properties of conductivity and electrochemical kinetics must go hand in hand, in particular, with low cost, low toxicity, high stability in organic solvents and electrolytes, permitting their use over a long period and with high dependability in devices such as batteries and electrochromic devices.

The goal of the present invention is to supply a lithium insertion compound which answers the needs and which meets the requirements stated above.

It is a further goal of the present invention to supply a lithium insertion compound that does not present the drawbacks, defects, limitations and disadvantages of the compounds of the prior art, and which solves the problems of the compounds of the prior art.

This goal and others are achieved, according to the invention, by a lithium insertion compound having the following formula (I):

$$Li_\alpha M_\beta M1_v M2_w M3_x M4_y M5_z B_\gamma (XO_{4-\epsilon} Z_\epsilon)_1 \quad (I)$$

M is an element in oxidation state +2, selected from $V^{2+}$, $Mn^{2+}$, $Fe^{2+}$, $Co^{2+}$ and $Ni^{2+}$;

M1 is an element in oxidation state +1, selected from $Na^+$ and $K^+$;

M2 is an element in oxidation state +2, selected from $Mg^{2+}$, $Zn^{2+}$, $Cu^{2+}$, $Ti^{2+}$, and $Ca^{2+}$;

M3 is an element in oxidation state +3, selected from $Al^{3+}$, $Ti^{3+}$, $Cr^{3+}$, $Fe^{3+}$, $Mn^{3+}$, $Ga^{3+}$, and $V^{3+}$;

M4 is an element in oxidation state +4, selected from $Ti^{4+}$, $Ge^{4+}$, $Sn^{4+}$, $V^{4+}$, and $Zr^{4+}$;

M5 is an element in oxidation state +5, selected from $V^{5+}$, $Nb^{5+}$, and $Ta^{5+}$;

X is an element in oxidation state m, where m is an integer, for example from 2 to 6, exclusively occupying a tetrahedral site and coordinated by oxygen or a halogen, which is selected from $B^{3+}$, $Al^{3+}$, $V^{5+}$, $Si^{4+}$, $P^{5+}$, $S^{6+}$, $Ge^{4+}$ and mixtures thereof;

Z is a halogen selected from F, Cl, Br and I;

the coefficients α, β, v, w, x, y, z, γ and ε are all positive and satisfy the following equations:

$$0 \leq \alpha \leq 2 \quad (1);$$

$$1 \leq \beta \leq 2 \quad (2);$$

$$0 < \gamma \quad (3);$$

$$0 \leq \alpha \leq 2 \quad (3);$$

$$0 \leq \epsilon \leq 2 \quad (4);$$

$$\alpha + 2\beta + 3\gamma + v + 2w + 3x + 4y + 5z + m = 8 - \epsilon \quad (5);$$

and $$0 < \frac{\gamma}{\beta + v + w + x + y + z} \leq 0.1. \quad (6)$$

Preferred compounds according to the invention are the compound in which M is $Fe^{2+}$, X is P, and v, W, x, y, z, and ε are equal to 0, that is the compound with the formula:

$$Li_\alpha Fe_\beta B_\gamma PO_4 \quad (II),$$

and the compound in which M is $Mn^{2+}$, X is P, and v, w, x, y, z, and ε are equal to 0 that is the compound with the formula:

$$Li_\alpha Mn_\beta B_\gamma PO_4 \quad (III)$$

Also preferably in the formulas (II) and (III), α is 1, and the compounds (II) and (III) therefore have the following formulas:

$$LiFe_\beta B_\gamma PO_4 \quad (IV)$$

and $$LiMn_\beta B_\gamma PO_4 \quad (V)$$

in which $\gamma/\beta \leq 0.1$.

Further preferred compounds are $LiFe_{0.95}B_{0.033}PO_4$, $Li_3Fe_{1.93}B_{0.07}(PO_4)_3$ (this formula clearly fits into the range of formula (I) by dividing all the coefficients by 3, but this writing is preferred because it shows that the olivine structure is not the same as the Nasicon structure) and $LiMn_{0.95}B_{0.033}$.

The compounds according to the invention can be described as Nasicon or olivine compounds doped with the non-metal boron (Z=5, M=10.81 g/mole).

In fact, the compounds of the olivine family and of the Nasicon family can be represented by the general formula $LiM(XO_4)$. After doping with boron, the compound according to the invention is obtained, with the formula, for example (I), in which the boron fundamentally, according to the invention, occupies a cationic site other than those occupied by the X cation or cations of the polyanionic skeleton $XO_{4-\epsilon}Z_\epsilon$. In other words, the boron occupies a cationic site, to the exclusion of the cationic sites present in the polyanionic entities or skeletons.

Boron may therefore substitute for, or replace, an Li or a metal atom of M, $M_1$, $M_2$, $M_3$, $M_4$, $M_5$, or occupy a vacant site. This substitution, or replacement, is achieved very easily, because boron has a very small ionic radius.

The material of the invention presents a very particular structure due to the very specific position occupied by the boron atoms in this structure. This structure fundamentally differentiates this material, the compound of the invention, from the compounds of the prior art, particularly the compounds described in document U.S. Pat. No. 6,085,015, where boron is exclusively part of the polyanionic entities $XO_4$.

The addition of boron, as carried out in the compound of the invention, serves significantly to increase the conduction of the charge carriers of the basic materials thus modified, and to obtain much higher levels of conductivity than those of the compounds of the prior art. Such conductivity levels permit the use of the compounds according to the invention in a lithium battery, even at high charge/discharge rates. It has thus been demonstrated that the compounds according to the invention, doped with boron, serve to achieve a gain in delivered capacity, that is, in available energy, for example of 40%, with a charge or discharge in 10 hours, and, for example, of 65% with a charge or a discharge in two hours.

Furthermore, basically, the lithium insertion compound according to the invention is characterized by the fact that the boron is added in a quantity that is less than or equal to 10 atomic %. This essential condition is reflected by the fact that in the formula (I), the equation (6)

$$0 < \frac{\gamma}{\beta + v + w + x + y + z} \leq 0.1$$

is satisfied, and preferably, $$0 < \frac{\gamma}{\beta + v + w + x + y + z} \leq 0.05.$$

In general, the ratio reflects a doping and it is therefore advantageous for it to be as low as possible for a given efficiency.

In document EP-A2-1 195 827 mentioned above, active cathode materials are described, but in these compounds with the formula $Li_xFe_{1-y}M_yPO_4$, where M may be B, the coefficient y is from 0 to 0.8, while in the examples of this document, only the specific compound $LiFe_{0.25}B_{0.75}PO_4$ (ratio of equation (6)=0.75/0.25=3) is explicitly mentioned.

This document therefore discloses a very broad range for the addition of boron, ranging from 0 (inclusive) to 0.8, hence the ratios of equation (6) are between 0 and 3.

The range claimed for boron doping according to the invention is such that this content serves to obtain the ratio of equation (6) lower than or equal to 0.1, the range according to the invention is hence very narrow in comparison with the range disclosed in document EP-A2-1 195 827. Furthermore, the range according to the invention is very remote from the sole and only value of 0.75 (ratio of equation (6) equal to 3) explicitly disclosed in the specific examples of document EP-A2-1 195 827.

It has been demonstrated that the compounds according to the invention, which have a boron doping level lying within this very narrow specific range, present a very high theoretical specific capacity, which is, surprisingly, much higher than that of the compounds possessing a boron content lying within the very broad interval of document EP-A2-1 195 827. Thus, for example, it has been demonstrated that the theoretical specific capacity of the compound $LiFe_{0.25}B_{0.75}PO_4$, which is the only compound given as an example in document EP-A2-1 195 827, was about three times lower than the theoretical specific capacity of the compound $LiFe_{0.25}B_{0.05}PO_4$ according to the invention, and in which the boron content lies within the very narrow range according to the invention.

This obviously shows that a novel technical effect, different from any effect obtained in the broad boron content range of the abovementioned European patent application, is achieved in the narrow range according to the invention.

This effect concerning a considerable increase in the theoretical specific capacity is surprising and unexpected. In fact, nothing tended to imply that by selecting such a specific narrow interval for the boron doping level, such an increase in the theoretical specific capacity would be obtained.

Without wishing to be bound by any theory, it can be explained, ex post facto, that the boron substitutes for the active metal. In fact, the specific capacity is proportional to the number of ions, for example, $Fe^{2+}$, which are converted, for example, to $Fe^{3+}$ ions, during the extraction of the lithium. Hence it can be considered that any decrease in the concentration, for example, of Fe, will be detrimental and that the substitution by boron must remain a doping, that is, must be low, that is, of less than about 10%.

The substantial improvement in the kinetics of the electrochemical reaction obtained with the compounds of the invention in comparison with the compounds of the prior art, but also, inter alia, the absence of toxicity, the high stability, the low cost of the compounds of the invention, makes them particularly adequate for use in lithium batteries, and in other devices, such as electrochromic devices.

The invention further relates to a method for preparing the boron-doped lithium insertion compound with formula (I).

The method consists in reacting the elements necessary for the formation of a compound with an olivine or Nasicon structure with at least one boron compound, in order to obtain the lithium insertion compound with formula (I), according to the invention. Said boron compound, also called borated (boron-containing) precursor, being a compound with the formula $BXO_{4-\epsilon}Z_\epsilon$ (VI), wherein X, Z, and $\epsilon$ have the meanings already given above.

In the method according to the invention and fundamentally, the boron compound or borated precursor is introduced in a very particular form, that is form B (polyanion). In fact, to prevent the boron from occupying the polyanion sites in the end product of formula (I), and for the specific structure of the compound (I) according to the invention to be obtained, the boron, during the synthesis of the compound of formula (I), must be in a form such that it can no longer bond with the oxygen ions of the polyanion. This aim is achieved in the method of the invention, by avoiding the use of borates or boron oxides as boron precursors, and by specifically using a boron compound in form B (polyanion).

The boron compound or precursor is preferably selected from the compounds $BPO_4$, $BVO_4$, $BAsO_4$ and $2B_2O_3\text{-}3SiO_2$ glass and mixtures thereof.

The method for synthesizing the compound of the invention can be a dry method or a wet method.

These methods, their respective steps, and the operating conditions of these steps, are well known to a person skilled in the art and are not described in detail in the present description; for a detailed description of these synthesis methods, reference can be made to the following documents: "A Powder Neutron Diffraction Investigation of the Two Rhombohedral Nasicon Analogues: $\gamma\text{-}Na_3Fe_2(PO_4)_3$ and $Li_2Fe_2(PO_4)_3$" by C. MASQUELIER et al., Chem. Matter. 2000, 12, 525-532; and "Optimized $LiFePO_4$ for Lithium Battery Cathodes" by A. YAMADA et al., Journal of the Electrochemical Society, 148 (3), A224-A229 (2001). However, the method according to the invention is basically characterized by the use of specific precursors which, alone, serve to obtain the specific structure of the compounds of formula (I) according to the invention.

In other words, the method according to the invention is distinguished from the known methods by the fact that it uses specific borated (boron-containing) precursors of type B (polyanion).

When the method is a dry method, the starting materials, that is essentially the elements for obtaining the compound of the olivine or Nasicon structure, necessary for the formation thereof, and the boron compound or borated precursor, are in powder form and the method comprises a heat treatment step.

When the method is a wet method, the starting materials are added to a solvent and the method comprises a crystallization step.

Whether the method is a dry method or a wet method, it is the use of the above specific boron compounds and borated precursors in the method of the invention, which confers on them their specific structure and their advantageous properties.

The invention further relates to active materials for electrodes, in particular for positive electrodes containing one or more compounds, such as described above.

In such active electrode materials, particularly of positive electrodes, the compounds according to the invention can possibly be combined with one or more other active compounds (that is, other than the compounds of the invention), such as conventional compounds, like $LiCoO_2$, $LiNiO_2$, manganese oxides, in particular, with a spinel structure $Li_{1+x}Mn_{2-x}O_4$ (where $0 \leq x \leq 0.33$), for example $LiMn_2O_4$, compounds of the olivine isotype family, such as $Li_{1-x}FePO_4$, for example $LiFePO_4$, compounds with the Nasicon structure, the lithium insertion materials of the orthosilicate type described in document U.S. Pat. No. 6,085,015, and the materials described in document EP-A2-1 195 827.

The invention further relates to a positive electrode comprising the active material, such as described above.

Besides the actual active electrode material, a positive electrode according to the invention generally comprises an electronic conducting material, which is preferably carbon in any form, such as carbon black, acetylene black, graphite or coke.

The positive electrode further comprises a polymer binder.

Said polymer binder is generally selected from fluoropolymers, elastomers and cellulose compounds.

The fluoropolymer can be selected, for example, from the vinylidine fluoride polymers and copolymers and the tetrafluoroethylene polymers and copolymers.

The positive electrode generally comprises between 75 and 95% by weight of active material, between 2 and 15% by weight of conducting material, and between 3 and 10% by weight of polymer binder.

To prepare the positive electrode, the active electrode material, the conducting material and the polymer binder dissolved in a solvent, such as acetone or N-methyl pyrrolidone, are mixed together. The mixture is applied, for example, by coating a substrate or a conducting material, for example of aluminium, generally in the form of a sheet, and the substrate on which the mixture has been applied is dried by heating, possibly under vacuum.

The invention further relates to a battery, such as a lithium battery, comprising said positive electrode.

Such a battery generally comprises, in addition to said positive electrode, a negative electrode, a separator, and an electrolyte. The negative electrode can be made of a material generally selected from lithium metal, lithium alloys, a lithium titanate.

The separator is generally made of a microporous polymer selected, for example, from polyolefins.

Finally, the electrolyte comprises a solvent and a conducting salt; the solvent is generally selected from ethylene carbonate, propylene carbonate, dimethyl carbonate, diethyl carbonate, ethyl and methyl carbonate, γ-butyrolactone, sulfolane, dialkyl ($C_{1-4}$) ethers of ethylene glycol or polyethylene glycol, for example, diethylene glycol, triethylene glycol, tetraethylene glycol, and mixtures thereof.

A preferred solvent is a mixture of ethylene carbonate and dimethyl carbonate.

The conducting salt is a lithium salt generally selected from lithium hexafluorophosphate, $LiPF_6$, $LiAsF_6$, $LiSbF_6$, $LiBF_4$, LiTFSI (lithium bis (trifluoromethanesulfonyl)imide) and mixtures thereof.

The invention finally relates to an electrochromic device comprising the compound according to the invention.

In such an electrochromic device, the compound or a material comprising the compound according to the invention is often in the form of a deposit on a substrate, for example on glass. The passage of current, that is the insertion/extraction of the lithium, modifies the optical properties of the material, for example, its colour, making it possible to obtain a window of which the colour varies. If not, the operation is identical to that of the battery.

The invention will be better understood from a reading of the description that follows, of embodiments of the invention, provided for illustration and non-limiting, with reference to the drawings appended hereto, in which:

FIG. 1 is a graph showing the galvanostatic cycling curve of the compound of example 1 ($LiFe_{0.95}B_{0.033}PO_4$) under two different cycling conditions (C/10 (0.05 mA/cm$^2$): curve in dotted line; C/2 (0.26 mA/cm$^2$): curve in solid line). The y-axis shows the voltage (in volts/Li/Li$^+$) and the x-axis shows the specific capacity (in mAh/g);

EXAMPLE 1

Figure 1:
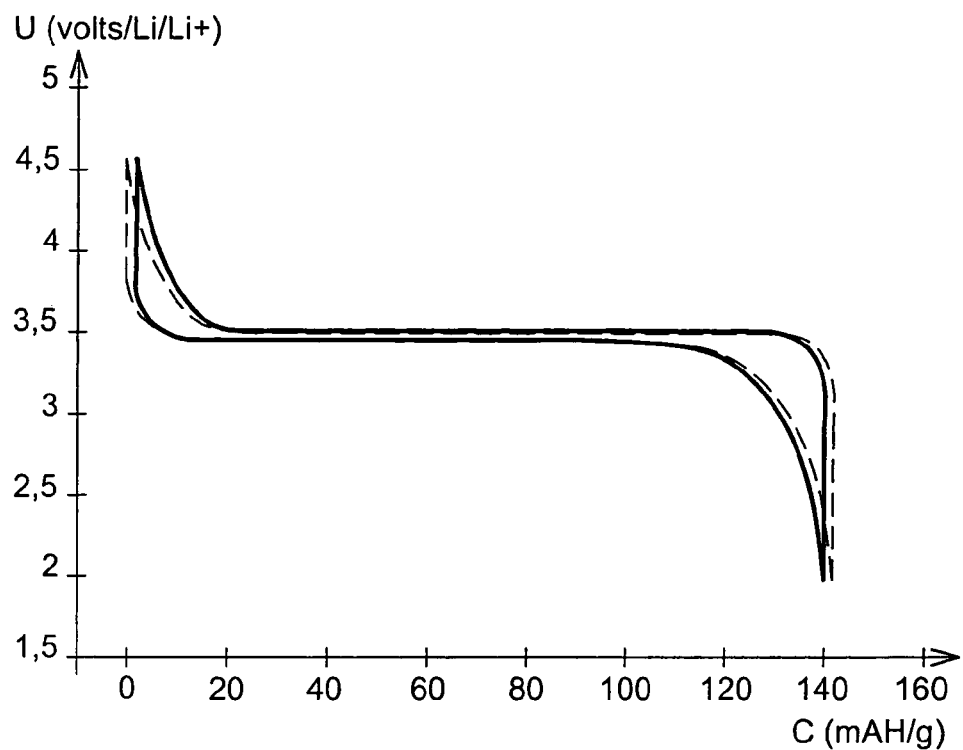

Preparation of the compound according to the invention with the formula $LiFe_{0.95}B_{0.033}PO_4$.

Fe (II) orthophosphate is prepared as reaction intermediate by precipitation in an aqueous phase from $FeSO_4.7H_2O$ in $Na_3PO_4$ medium, the precipitate forms immediately. 10.16 g of the orthophosphate $Fe_3(PO_4)_2.5H_2O$ thus obtained is then intimately mixed with 2.76 g of $Li_3PO_4$ and 0.23 g of $BPO_4$ in a mill under inert atmosphere (Ar or $N_2$) for at least 8 hours.

The resulting mixture is then heat-treated under inert atmosphere for 15 minutes at a temperature of 600° C.

A boron-doped olivine is obtained with a B/Fe atomic ratio of 0.035 with the formula $LiFe_{0.95}B_{0.033}PO_4$.

EXAMPLE 2

Preparation of the compound according to the invention with the formula $LiMn_{0.95}B_{0.033}PO_4$.

15.47 g of manganese phosphate (III) of the hureaulite form ($Mn_5(PO_4)_2(PO_3OH)_2.4H_2O$) is intimately mixed with 2.52 g of $MnCO_3.xH_2O$ x=0.2, 4.92 g of $Li_3PO_4$ and 0.40 g of $BPO_4$ in a mill under inert atmosphere (Ar or $N_2$) for at least 8 hours.

The resulting mixture is then heat-treated under inert atmosphere for 15 minutes at a temperature of 600° C.

A boron-doped olivine is obtained with a B/Mn atomic ratio of 0.035 with the formula $Mn_{0.95}B_{0.033}PO_4$.

EXAMPLE 3

Preparation of the compound according to the invention with the formula $Li_3Fe_{1.93}B_{0.07}(PO_4)_3$.

15.0 g of $FePO_4.xH_2O$ (M=188.04 g/mol), 6.74 g of $Na_3PO_4$ and 0.304 g of $BPO_4$ are intimately mixed under air in a planetary mill for 20 hours. This mechanically-chemically activated mixture then undergoes heat treatment at 800° C. in air for 15 minutes. A compound of the Nasicon isotype structure with a formulation approaching $Na_3Fe_{1.93}B_{0.07}$ $(PO_4)_3$ is obtained. The final compound with the formula $Li_3Fe_{1.93}B_{0.07}(PO_4)_3$ is then obtained by ion exchange from $Na_3Fe_{1.93}B_{0.07}(PO_4)_3$ in a concentrated solution of $LiNO_3$ in $H_2O$ with $Li_{solution}/Na_{solid} > 10$ for 1 day.

EXAMPLES 4

EXAMPLE 4A

Fabrication of a lithium battery of which the positive electrode comprises the compound according to the invention prepared in example 1.

a) Fabrication of the Positive Electrode

The product obtained in example 1 is mixed with 80% by weight of acetylene black (Super P, MMM Carbon, Belgium) (10%) and polyvinylidene fluoride (Solef 6020, Solvay, Belgium) (10%) dissolved in N-methyl-pyrrolidone.

The mixture is then applied to an aluminium sheet, then dried at 60° C., and then heated to 100° C. under vacuum.

b) Fabrication of the Battery

The positive electrode thus prepared is introduced into a "button battery" type cell format 2432. The negative electrode consists of a sheet of battery grade lithium (Chemetall-Foote Corporation, USA). The separator consists of a film of microporous polypropylene (Celgard 3200, Aventis). The electrolyte used consists of ethylene carbonate, dimethyl carbonate and lithium hexafluorophosphate ($LiPF_6$) (Electrolyte Selectipur LP30, Merck, Federal Republic of Germany).

c) Tests Performed with the Battery

As may be observed in FIG. 1, at 25° C., the battery thus fabricated operates between 4.5 V and 2.0 V and permits the reversible extraction/insertion of lithium corresponding to above 140 mAh/g of positive active compound under C/2 cycling conditions, that is with a charge or discharge in two hours (curve in solid line); and at about 145 mAh/g at C/10, that is, with a charge or a discharge in 10 hours (curve in continuous line).

In other words, the C/2 charge/discharge cycling serves to obtain a specific capacity of 140 mAh/g.

Figure 2:
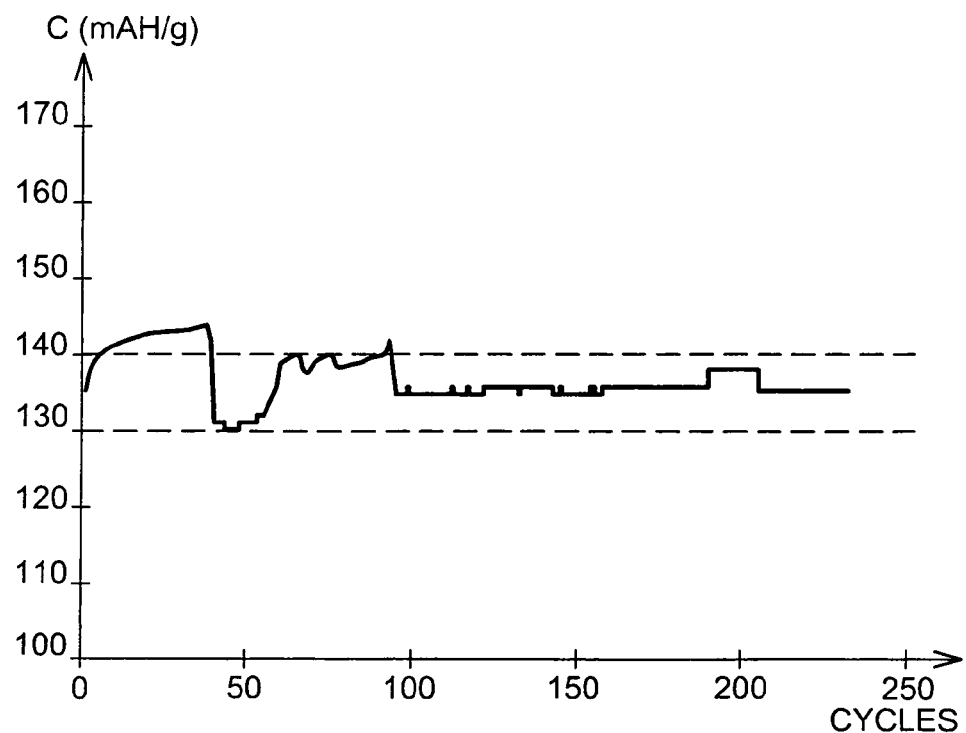
FIG. 2 is a graph showing the variation in specific capacity (in mAh/g) of the compound of example 1 ($LiFe_{0.95}B_{0.033}PO_4$) as a function of the number of cycles under different cycling conditions (by order of increasing numbers of cycles C/10, C/1, C/3, C/2, C/1)

FIG. 2 shows the variation in specific capacity (mAh/g) of the compound $LiFe_{0.95}B_{0.033}PO_4$ proposed in example 1, as a function of the number of cycles and under various cycling condition (C/10, C/1, C/3, C/2, C/1).

It may be observed in FIG. 2 that the specific capacity obtained under slow cycling (C/10) is relatively unaffected by the increase in cycling rate (C/1).

EXAMPLE 4B

A battery is fabricated in the same way as in example 4A, the only difference being the use, in the positive electrode, of the compound according to the invention prepared in example 2. The characteristics of the battery, particularly as regards the specific capacity, are similar to those of the battery of example 4A.

EXAMPLE 4C

A battery is fabricated in the same way as in example 4A, the only difference being the use, in the positive electrode, of the compound according to the invention prepared in example 3. The characteristics of the battery, particularly as regards the specific capacity, are similar to those of the battery of example 4A.

EXAMPLE 5 COMPARATIVE

In this example, a lithium battery is fabricated in the same way as in example 4, in which however the positive electrode consists of $LiFePO_4$ not doped with boron, that is, with a compound not according to the invention.

Figure 3:
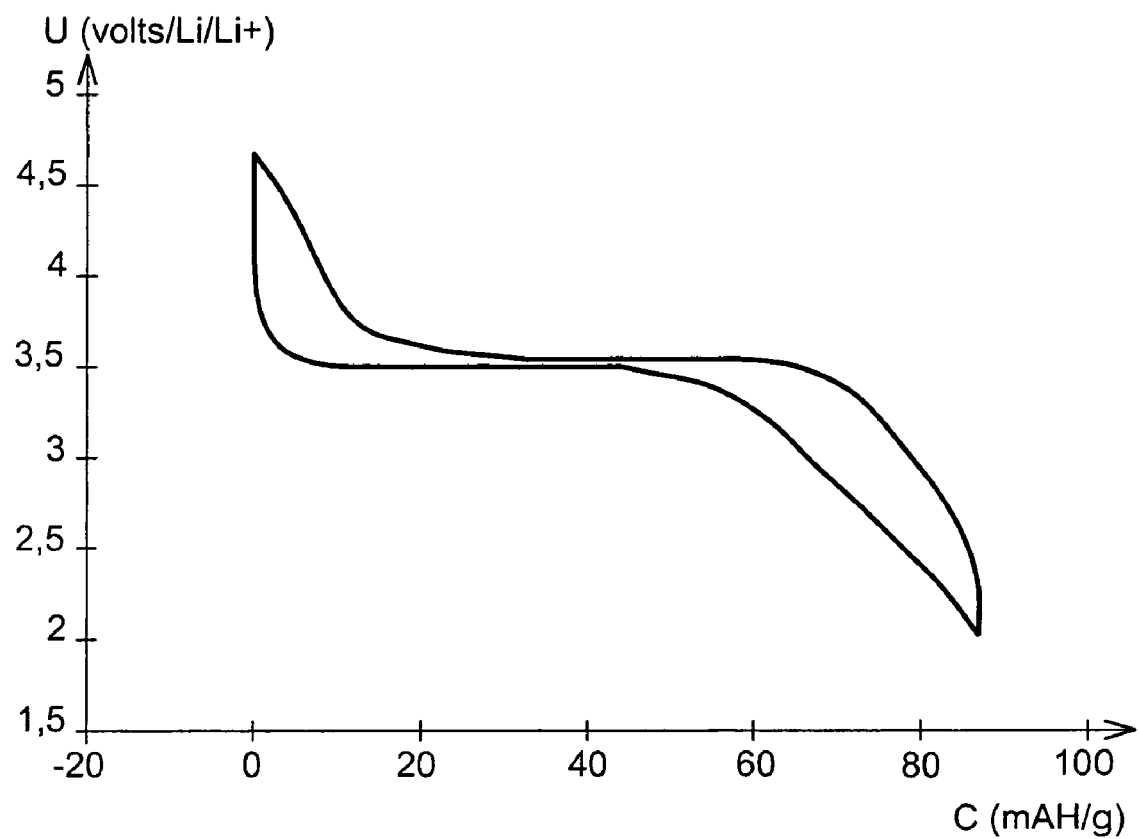
FIG. 3 is a graph showing the galvanostatic cycling curve of the undoped compound $LiFePO_4$.

The galvanostatic cycling curve of the non-doped compound $LiFePO_4$ is shown in FIG. 3. The specific capacity of this boron-free material is 80 mAh/g given by FIG. 3, for C/7 cycling and corresponding to a current density of 17 µA/cm² imposed on the electrode.

This value of 80 mAh/g, obtained for C/7 cycling, which is much less constraining than C/2, should be compared with the specific capacity of 140 mAh/g obtained with the compound according to the invention in example 4A with a constraining C/2 cycling.

EXAMPLE 6 COMPARATIVE

In this example, a lithium battery is fabricated in the same way as in example 4, in which however the positive electrode consists of $LiMnPO_4$ not doped with boron.

Table I below shows the comparison of the electrochemical performance as regards the delivered capacity (available energy at 25° C.) of the batteries of examples 4A, 5 and 6.

TABLE I

| | Compound | Cycling | Delivered capacity (mAh/g) |
|---|---|---|---|
| Example 5 (comparative) | $LiFePO_4$ Not doped by B | C/10 C/2 | 85 50 |
| Example 6 (comparative) | $LiMnPO_4$ Not doped by B | C/10 | 80 |
| Example 4A (invention) | $LiFe_{0.95}B_{0.033}PO_4$ | C/10 C/2 | 145 140 |

It appears from the table that the boron doping procures a 40% increase in capacity at C/10 and a 65% gain at C/2.

The faster the cycling conditions, the greater the increase in capacity obtained, due to the boron doping of the compound according to the invention.

This table clearly demonstrates that the lithium insertion kinetics is improved by the boron doping of the compounds according to the invention.

Equivalent improvements in the properties are obtained with the batteries of examples 4B (compound according to the invention of example 2) and 4C (compound according to the invention of example 3).

The invention claimed is:

1. A lithium insertion compound having the following formula (I):

$$Li_\alpha M_\beta M1_v M2_w M3_x M4_y M5_z B_\gamma (XO_{4-\epsilon} Z_\epsilon)$$ (I)

M is an element in oxidation state +2, selected from the group consisting of $V^{2+}$, $Mn^{2+}$, Fe2+, $Co^{2+}$ and $Ni^{2+}$;

M1 is an element in oxidation state +1, selected from the group consisting of $Na^+$ and $K^+$;

M2 is an element in oxidation state +2, selected from the group consisting of $Mg^{2+}$, $Zn^{2+}$, $Cu^{2+}$, $Ti^{2+}$, and $Ca^{2+}$;

M3 is an element in oxidation state +3, selected from the group consisting of $Al^{3+}$, $Ti^{3+}$, $Cr^{3+}$, $Fe^{3+}$, $Mn^{3+}$, $Ga^{3+}$, and $V^{3+}$;

M4 is an element in oxidation state +4, selected from the group consisting of $Ti^{4+}$, $Ge^{4+}$, $Sn^{4+}$, $V^{4+}$, and $Zr^{4+}$;

M5 is an element in oxidation state +5, selected from the group consisting of $V^{5+}$, $Nb^{5+}$, and $Ta^{5+}$;

X is an element in oxidation state m, where m is an integer, from 2 to 6, exclusively occupying a tetrahedral site and coordinated by oxygen or a halogen, which is selected from the group consisting of $B^{3+}$, $Al^{3+}$, $V^{5+}$, $Si^{4+}$, $P^{5+}$, $S^{6+}$, $Ge^{4+}$ and mixtures thereof;

Z is a halogen selected from the group consisting of F, Cl, Br and I;

the coefficients $\alpha$, $\beta$, $v$, $w$, $x$, $y$, $z$, $\gamma$ and $\epsilon$ are all positive or equal 0 and satisfy the following equations:

$$0 \leq \alpha \leq 2 \quad (1);$$

$$1 \leq \beta \leq 2 \quad (2);$$

$$0 < \gamma \quad (3);$$

$$0 \leq \epsilon \leq 2 \quad (4);$$

$$\alpha + 2\beta + 3\gamma + v + 2w + 3x + 4y + 5z + m = 8 - \epsilon \quad (5); \text{ and}$$

$$0 < \frac{\gamma}{\beta + v + w + x + y + z} \leq 0.1.$$

2. The compound according to claim 1, in which M is $Fe^{2+}$, X is P, and v, w, x, y, z, and $\epsilon$ are equal to 0 and which has the following formula (II):

$$Li_\alpha Fe_\beta B_\gamma PO_4 \quad (II).$$

3. The compound according to claim 1, in which M is $Mn^{2+}$, X is P, and v, w, x, y, z, and $\epsilon$ are equal to 0 and which has the following formula (III):

$$Li_\alpha Mn_\beta B_\gamma PO_4 \quad (III).$$

4. The compound according to claim 2, in which $\alpha=1$ and which has the following formula (IV):

$$LiFe_\beta B_\gamma PO_4 \quad (IV)$$

with $\gamma/\beta \leq 0.1$.

5. The compound according to claim 3, in which $\alpha=1$ and which has the following formula (V):

$$LiMn_\beta B_\gamma PO_4 \quad (V)$$

with $\gamma/\beta \leq 0.1$.

6. The compound according to claim 4, which is $LiFe_{0.95}B_{0.033}PO_4$.

7. The Compound according to claim 4, which is $Li_3Fe_{1.93}B_{0.07}(PO_4)_3$.

8. The compound according to claim 5, which is $LiMn_{0.95}B_{0.033}PO_4$.

9. The lithium insertion compound of claim 1, wherein the coefficients $\alpha, \beta$, v,w,x,y,z,$\gamma$ and $\epsilon$ are all positive or equal 0 and satisfy the following equations:

$$0 \leq \alpha \leq 2 \quad (1);$$

$$1 \leq \beta \leq 2 \quad (2);$$

$$0 < \gamma \quad (3);$$

$$0 \leq \epsilon \leq 2 \quad (4);$$

$$\alpha + 2\beta + 3\gamma + v + 2w + 3x + 4y + 5z + m = 8 - \epsilon \quad (5); \text{ and}$$

$$0 < \frac{\gamma}{\beta + v + w + x + y + z} \leq 0.05.$$

10. A method for preparing a lithium insertion compound according to claim 1, in which the elements necessary for the formation of a compound with an olivine or Nasicon structure are reacted with at least one boron compound with the formula $BXO_{4-\epsilon}Z_\epsilon$ (VI) where X, Z and $\epsilon$ have the meanings already given in claim 1, to yield the lithium insertion compound having formula (I).

11. The method according to claim 10, in which said boron compound is selected from the group consisting $BPO_4$, $BVO_4$, $BAsO_4$, $2B_2O_3 \cdot 3SiO_2$ glass and mixtures thereof.

12. The method according to claim 10, which is a wet method, in which the elements necessary for the formation of the compound with a Nasicon or olivine structure and the boron compound are in powder form and which comprises a heat treatment step.

13. The method according to claim 10, which is a wet method, in which the elements necessary for the formation of the compound with a Nasicon or olivine structure and the boron compound are added to a solvent and which comprises a crystallization step.

14. An active electrode material containing one or more compounds according to claim 1.

15. A positive electrode comprising the active material according to claim 14.

16. A battery comprising the electrode according to claim 15.

17. The active electrode material of claim 14 further comprising one or more other active compounds, wherein the one or more other active compounds are selected from the group consisting of $LiCoO_2$, $LiNiO_2$, manganese oxides, compounds of the olivine isotype family, compounds having the Nasicon structure, and lithium insertion materials of orthosilicate type.

18. The active electrode material of claim 17, wherein the manganese oxides have a spinel structure $Li_{1+x}Mn_{2-x}O_4$ (with $0 \leq x \leq 0.33$) and the compounds of the olivine isotype family have a structure $Li_{1-x}FePO_4$.

19. The active electrode material of claim 18, wherein the manganese oxides comprise $LiMn_2O_4$ and the compounds of the olivine isotype family comprise $LiFePO_4$.

20. An electrochromic device comprising the compound according to claim 1.

* * * * *